United States Patent
Adragna

(10) Patent No.: US 8,330,389 B2
(45) Date of Patent: Dec. 11, 2012

(54) SWITCHING POWER SUPPLY SYSTEM FOR OPTICAL SOURCES OR A LOAD REQUIRING A CONTROLLED SUPPLY CURRENT

(75) Inventor: Claudio Adragna, Monza (IT)

(73) Assignee: STMicroelectronics s.r.l., Agrate Brianza (IT)

( * ) Notice: Subject to any disclaimer, the term of this patent is extended or adjusted under 35 U.S.C. 154(b) by 363 days.

(21) Appl. No.: 12/643,883

(22) Filed: Dec. 21, 2009

(65) Prior Publication Data

US 2010/0164400 A1 Jul. 1, 2010

(30) Foreign Application Priority Data

Dec. 31, 2008 (IT) .............................. RM2008A0701

(51) Int. Cl.
*H05B 37/02* (2006.01)
(52) U.S. Cl. ........................ 315/294; 315/247; 315/291
(58) Field of Classification Search .................. 315/224, 315/291, 307, 294, 247, 209 R, 312; 323/282; 363/21.02
See application file for complete search history.

(56) References Cited

U.S. PATENT DOCUMENTS

| | | | | |
|---|---|---|---|---|
| 6,040,663 A * | 3/2000 | Bucks et al. | ................... | 315/291 |
| 6,577,512 B2 * | 6/2003 | Tripathi et al. | ............. | 363/21.17 |
| 7,885,085 B2 * | 2/2011 | Orr et al. | ..................... | 363/21.02 |
| 7,994,727 B2 * | 8/2011 | De Anna et al. | ............... | 315/224 |
| 8,063,577 B2 * | 11/2011 | Sauerlaender et al. | ........ | 315/291 |
| 2002/0186026 A1 * | 12/2002 | Elferich | ......................... | 324/652 |
| 2006/0239689 A1 | 10/2006 | Ashdown | | |
| 2008/0055948 A1 * | 3/2008 | Wu et al. | .......................... | 363/84 |
| 2009/0230875 A1 | 9/2009 | Sauerlaender et al. | | |

FOREIGN PATENT DOCUMENTS

| | | |
|---|---|---|
| WO | WO2008/029325 | 3/2008 |
| WO | WO2008/089541 | 7/2008 |

OTHER PUBLICATIONS

Teng Liu, "A Novel Precise Design Method for LLC Series Resonant Converter"; Delta Power Electronics Center; IEEE Explore; Sep. 1, 2006; pp. 1-6; China P.R.C.

Ministero dello Sviluppo Econiomico; Italian Search Report for STMicroelectronics S.R.L.; Application No. ITRM20080701 dated Nov. 2, 2009; pp. 1-7.

* cited by examiner

Primary Examiner — Jacob Y Choi
Assistant Examiner — Ephrem Alemu
(74) Attorney, Agent, or Firm — Hogan Lovells US LLP

(57) ABSTRACT

A switching power supply for supplying a load requiring a controlled current includes a PFC pre-regulator for receiving an input voltage and providing an output voltage, and a DC-DC switching converter for receiving at input the voltage output by the pre-regulator and for providing at output a supply voltage of said load. The switching DC-DC converter operates at a fixed and constant operating frequency, is a resonant converter and includes an LLC resonant circuit.

20 Claims, 6 Drawing Sheets

US 8,330,389 B2

SWITCHING POWER SUPPLY SYSTEM FOR OPTICAL SOURCES OR A LOAD REQUIRING A CONTROLLED SUPPLY CURRENT

RELATED APPLICATION

The present application claims priority of Italian Patent application No. RM2008A000701 filed Dec. 31, 2008, which is incorporated herein in its entirety by this reference.

FIELD OF THE INVENTION

The present invention relates to a power supply system for optical sources, and in particular for LED power diodes, or more generally, for a load requiring a controlled supply current.

BACKGROUND OF THE INVENTION

In recent years, LED power diodes have emerged on the market which may find possible use in the lighting sector, for example in street lights. Such power diodes are lighting sources with supply currents up to 1.5 A and nominal operational voltages around 3.5. With respect to the power supply for such applications, the LED diodes require a controlled and constant current, which influences the brightness and color temperature.

A particularly notable feature of these LEDs is their long life of approximately 50,000-100,000 hours, which allows for a long lasting and low maintenance lighting apparatus.

There is a need for power supply systems for such LED diodes which will have an operating life similar to that of the LED diodes. However, this object is not simple to achieve. For example, in the particular case of public/street lighting, the power supply systems have to be supplied by the public energy grid, are used outdoors, and therefore are subject to stressful conditions such as temperature, voltage peaks, lightning strikes, mechanical stresses, etc.

Still with reference to the particular sector of public/street lighting, in some public lighting systems, remote control of the activation and deactivation of each lighting apparatus, brightness adjustment for energy saving reasons, and collecting of operating data for diagnostic or other reasons is required. A technique which is increasingly popular for achieving these goals is the use of a power line modem (PLM), i.e., a modem for receiving and transmitting data which uses as a physical carrier the same power supply cables of the lighting apparatus. There are clear economic advantages to such a technique.

With reference to FIG. 1, showing the functional block diagram of a lighting apparatus 1 with LED diodes 2, the above said technique is problematic in that the transceiver port of PLM modem 3 and input of supply and switching system 4 of diodes 2 are coincident. Indeed, they are parallel-connected in order to be supplied with the grid voltage $V_{AC}$.

Moreover, the power supply system 4 when operating in switching mode, emits electrical noise at its switching frequency and harmonics, as well as at oscillation frequency of parasite resonant circuits in the system, stimulated by switching and respective harmonics. Furthermore, the simultaneous presence of harmonics at different frequencies gives rise to intermodulation effects, which generates further harmonic components. The harmonics of this electrical noise which are within the frequency band used by PLM modem 3 may damage the transmitted signal, or worse, the received signal, which has a lower amplitude, since it is attenuated by the propagation path.

In order to avoid this, it is necessary to provide filters 5, 6 which minimize the noise which the supply system 4 backwardly injects through the input terminals, as well as the noise entering from the input port of PLM modem 3. It is also necessary to minimize the direct coupling between the switching supply system 4 and PLM modem 3.

FIG. 2 shows the functional block diagram of a power supply system 4 of the known art for supplying power LED diodes 2. The power supply system 4 comprises a PFC (Power Factor Corrector) pre-regulator 5 so as to receive from the power grid a substantially sinusoidal current which is in phase with grid voltage $V_{AC}$. Typically, the PFC pre-regulator 5 is comprised of a boost converter for generating an approximately continuous voltage over the output capacitor 8, starting with a rectified grid voltage $V_{AC}$.

The power supply system 4 also comprises a DC-DC converter 6 for converting the output voltage $V_{IN}$ of PFC pre-regulator 5 into a continuous voltage $V_{OUT}$ of suitable value for supplying the LED diode group, at the same time providing the insulation required by safety regulations. Also for safety reasons, it is often required that the output voltage $V_{OUT}$ is not higher than 60 V even in case of failure, in order to comply with SELV (Safety Extra Low Voltage) specifications. A typical value is 48 V. In the switching power supply system 4 there is also provided a feedback control loop 8, 9 associated with the DC-DC converter 6 in order to keep the output voltage $V_{OUT}$ at the specified value, with respect to a variable current absorbed by the load and input voltage $V_{IN}$. Various topologies for DC-DC converter 6 may be used; however, in order to obtain the maximum conversion efficiency possible, resonant DC-DC converters 6 are employed.

The switching power supply system 4 also comprises one or more current regulators 7, each associated with a respective string of series-connected LED diodes, the strings being parallel-connected to each other. The reason for using various strings of parallel-connected LED diodes is that with voltages of 48 V and using common 1 A LEDs, it is not possible to provide power above approximately 50 W, whereas in the case of street lighting, higher power levels are often required (up to 150-200 W). In order to achieve such power levels, it is therefore necessary to provide many parallel-connected strings of series-connected LED diodes. However, the voltage drop on each string of LED diodes is highly variable with respect to production tolerances. Therefore, if these would be directly parallel-connected to the output of DC-DC converter 6, the string showing the least drop would absorb all the power provided by the DC-DC converter 6, whereas the other would remain switched off. This is obviously unacceptable; the current of LED diodes has to be the same for all the LED diodes strings in order to provide an uniform lighting. To this end, a current regulator 7 is provided for each string. This not only regulates the current at the desired value, but also acts as a "damper", absorbing the difference between voltage provided by DC-DC converter 6 and the one present at the ends of each string.

With reference to FIG. 3, such current regulators are, for example, comprised of a non insulated switching converter and a feedback current control loop. The current regulator 7 of FIG. 3 is, for example, provided with a monolithic regulator 10 (i.e., the control section and power section all on the same board) at a constant frequency and with PWM modulation (pulse width modulation). In the example of FIG. 3, the monolithic regulator 10 is an integrated circuit produced by STMicroelectronics and is sold as model L6902D. In FIG. 3, reference 11 indicates a string of five LED diodes 2, whereas the terminal 12 is the output terminal of DC-DC converter 6 of FIG. 2.

A power supply system 4 of the state of the art of above said type for use within a lighting apparatus or fixture, when provided with a communication system with PLM modem 3, has some drawbacks which are described below.

The boost PFC pre-regulator 5 for managing the expected power levels uses control techniques which render its switching frequency variable in time with instantaneous grid voltage in a value range which depends from both the grid effective voltage and load. It may be almost impossible to ensure that neither the fundamental component nor any of its harmonics fall within the transmission band of PLM modem 5.

In the specific case wherein the DC-DC converter 6 is a resonant converter, the regulation of output voltage $V_{OUT}$ is obtained by varying the frequency according to the input voltage and load. In the supply system 4, since the input voltage of DC-DC switching converter 6 is the voltage output by PFC pre-regulator 5, the operating frequency changes according to input voltage are limited but non-zero, since in the output voltage of pre-regulator 5 an alternating component is present, with a frequency which is two times the grid voltage $V_{AC}$ frequency superimposed to a continuous voltage value. This causes a modulation of operating frequency of DC-DC switching converter 6. The frequency variations due to load variations remain the same (e.g., in case of lighting adjustments). These operating frequencies are different from those of the pre-regulator 5, so that also the intermodulation harmonics are present, which may be within the transmission band of PLM modem 3.

The output voltage of the DC-DC switching converter 6 is regulated by means of a feedback control loop 8, 9 which compares the output voltage with a reference value, and through the generated error signal, changes the operating frequency of DC-DC switching converter 6. In doing this, the error signal has to cross the insulating barrier between the input and output of DC-DC switching converter 6, required by safety regulations. In order to let the error signal cross the insulating barrier, a photo-coupler 9 is typically employed. This has a limited average life span, unless a very expensive device is used, and this negatively influences the life span of the whole supply system 4. Moreover, in case of lightning strike, the photo-coupler 9 is one of the components most sensible to failure.

Another important element of a supply system 4 of above type is the electrolytic capacitor 8 at output of PFC pre-regulator 5. The electrolytic capacitor 8 is subject to a considerable current stress of a low frequency component (two times the grid frequency) due to the fact that, measured in the scale of the grid frequency, a PFC pre-regulator 5 behaves like a floating power generator at high frequency, due to the combined effect of switching by PFC pre-regulator 5 and of downstream DC-DC switching converter 6.

Accordingly, there remains a need for a switching power supply system which obviates above drawbacks of known power supply systems.

SUMMARY OF THE INVENTION

The above object is achieved by a switching power supply which includes a PFC pre-regulator for receiving an input voltage and providing an output voltage and a DC-DC switching converter which is a resonant converter, operates at a fixed and constant operating frequency and includes an LLC resonant circuit. The DC-DC switching converter receives at input the voltage output by the pre-regulator and provides at output a supply voltage for a load.

The present invention also relates to a lighting apparatus which includes a switching power supply of the present invention and one or more strings of power LED diodes. The one or more strings are parallel connected and the load comprises the one or more strings of power LED diodes.

BRIEF DESCRIPTION OF THE DRAWINGS

The invention will be better understood from the following detailed description of one of its preferred embodiments, which is only illustrative and therefore non limiting with reference to appended drawings, wherein.

In the figures, same or like elements are indicated by same reference numerals.

DETAILED DESCRIPTION OF PREFERRED EMBODIMENTS

Figure 4:
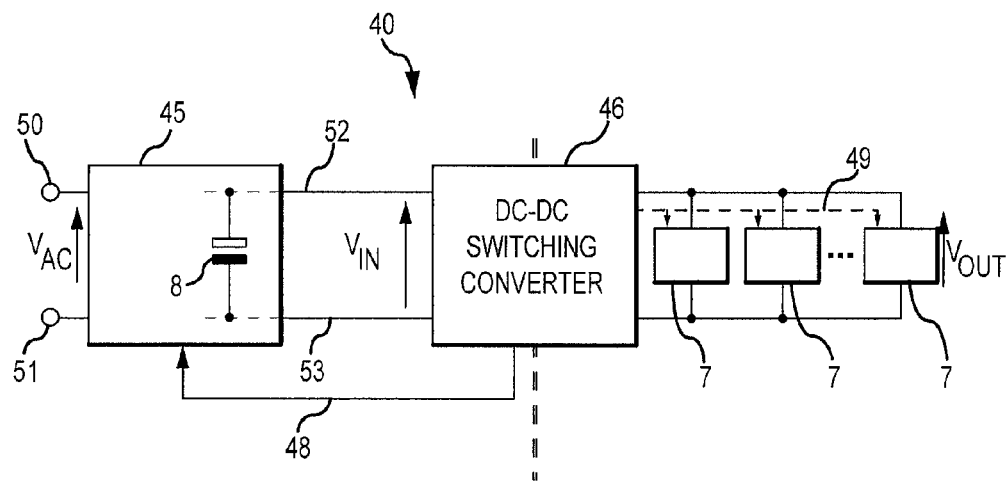
FIG. 4 shows a block diagram of a switching supply system comprising a DC-DC converter with a resonant circuit LLC according to an embodiment of the invention.

With reference to FIG. 4, reference 40 generally indicates a switching power supply system for a load requiring a controlled current. According to a preferred non-limiting embodiment, the power supply system 40 is a power supply system for optical sources. More preferably, the system 40 is a power supply system for LED power diodes. As is known, such diodes require a controlled and constant supply current. More particularly, the described embodiment refers to a power supply system 40 for supplying one or more parallel-connected strings of LED diodes, each of said strings comprising a plurality of series-connected LED diodes.

However, it is to be noted that there are also other applications, such as in the electric motor control sector, or for example in the field of load guidance formed by one or more electro-acoustic devices, wherein a controlled current has to be supplied to a load. Thus, the use of a switching power supply system according to the present invention is not limited to the specific case in which the load is a power LED diode. For sake of simplicity of the description, from now on, reference will be only made to the specific case of a power supply system 40 for power LED diodes, without introducing any limitation.

The switching power supply system 40 comprises a PFC pre-regulator 45, preferably a FF-CCM (fixed frequency-continuous conduction mode), for receiving at its input terminal 50, 51 an input voltage $V_{AC}$ from the grid. Preferably, such grid voltage $V_{AC}$ is a rectified alternating grid voltage, so that at input of pre-regulator 45, the system 40 may also include a rectifier (not shown). Moreover, upstream with respect to the rectifier (i.e., at an input of the rectifier) a filtering device may be conveniently disposed (not shown), which is supplied by grid voltage and constrains the electromagnetic interference of the grid within limits imposed by regulations.

According to an embodiment of the present invention, the PFC pre-regulator 45 is of the boost type and provides as output an approximately continuous voltage $V_{IN}$ whose amplitude is higher than that of the input voltage $V_{AC}$.

The power supply system 40 also comprises a DC-DC switching converter 46 with a resonant LLC circuit connected to output terminals 52, 53 of PFC pre-regulator 45 in order to receive, at input, the approximately continuous voltage $V_{IN}$ output by PFC pre-regulator 45.

The power supply system 40 also comprises one or more current regulators 7, which are parallel-connected to the output of DC-DC switching converter 46. Each of said current regulators 7 supply a respective string of LED diodes.

According to a particularly advantageous embodiment, the power supply system 40 also comprises a system 48 for synchronizing the operating frequency, or switching frequency, of PFC pre-regulator 45 with respect to operating frequency of DC-DC switching converter 46.

According to a further embodiment, the switching power supply system 40 also comprises a system for synchronizing the operating frequencies of current regulators 7 with respect to frequency of DC-DC switching converter 46.

Figure 5:
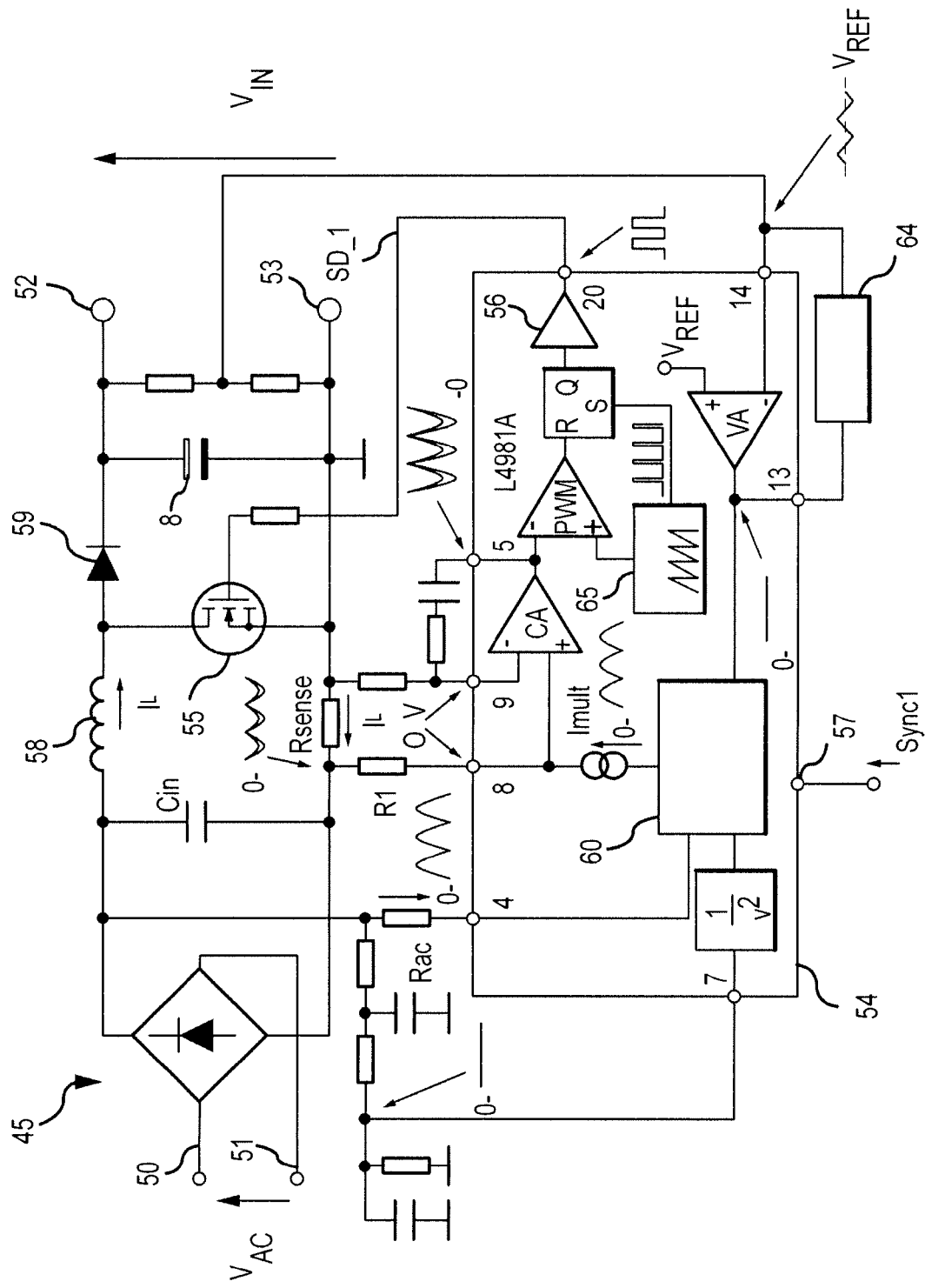
FIG. 5 shows the circuit diagram of a PFC pre-regulator to be used in the power supply system of FIG. 4.

With reference to FIG. 5, an example of a PFC pre-regulator 45 is shown, which may be conveniently used in the switching power supply system 40. The PFC pre-regulator 45 comprises a conversion circuit 55, 58, 59 for supplying the output terminals 52, 53 of PFC pre-regulator 45 an output voltage $V_{IN}$, having an amplitude higher than that of voltage received on input terminals 50, 51. For example, the input voltage $V_{AC}$ is an alternating voltage with an rms value between 88 and 264 V, whereas the output voltage $V_{IN}$ is approximately continuous, with a value of approx. 400 V. In order to achieve this, the conversion circuit 55, 58, 59 is implemented by a circuit structure already known to the skilled in the art, comprising an inductance 58, which is the energy accumulation element, a diode 59 and a switch 55, preferably a power switch like a MOSFET, controlled by a drive signal SD_1.

In the PFC pre-regulator 45, an integrated control circuit 54 is associated to the conversion circuit 55, 58, 59, which is suitably provided with a feedback, comprising a local oscillator 65. The integrated control circuit 54 comprises a driver 56 for outputting a control signal SD_1 to the switch 55. In the particular example of FIG. 5, the integrated control circuit 54 is an integrated circuit manufactured by STMicroelectronics as model L4981, which may operate at a substantially fixed operating frequency. In FIG. 5, reference 60 indicates an analog current multiplier, and reference 64 is a frequency compensation block. It is to be noted that the integrated circuit 54 is provided with an input 57 for receiving a sync signal Sync1. The integrated circuit 54 is known to the skilled in the art and therefore will not be described in further detail.

The PFC pre-regulator 45 of FIG. 5 is a boost converter operating at a fixed operating frequency. The oscillator 65 of control circuit 54 is such as to determine the operating frequency $f_{sw}$ of said boost converter.

In a particularly preferred embodiment, the switching power supply system 40 is to be used in a lighting apparatus comprising a PLM modem and if $(f_{min}, f_{max})$ is the frequency band used by PLM modem, the operating frequency $f_{sw}$ of said boost converter is selected at a slightly lower than $f_{min}$, if $f_{max}/f_{min} \leq 2$, or higher than $f_{max}$ if $f_{max}/f_{min} > 2$, so that neither the fundamental component nor one of its harmonics fall within the frequency band used by PLM modem.

Figure 6:
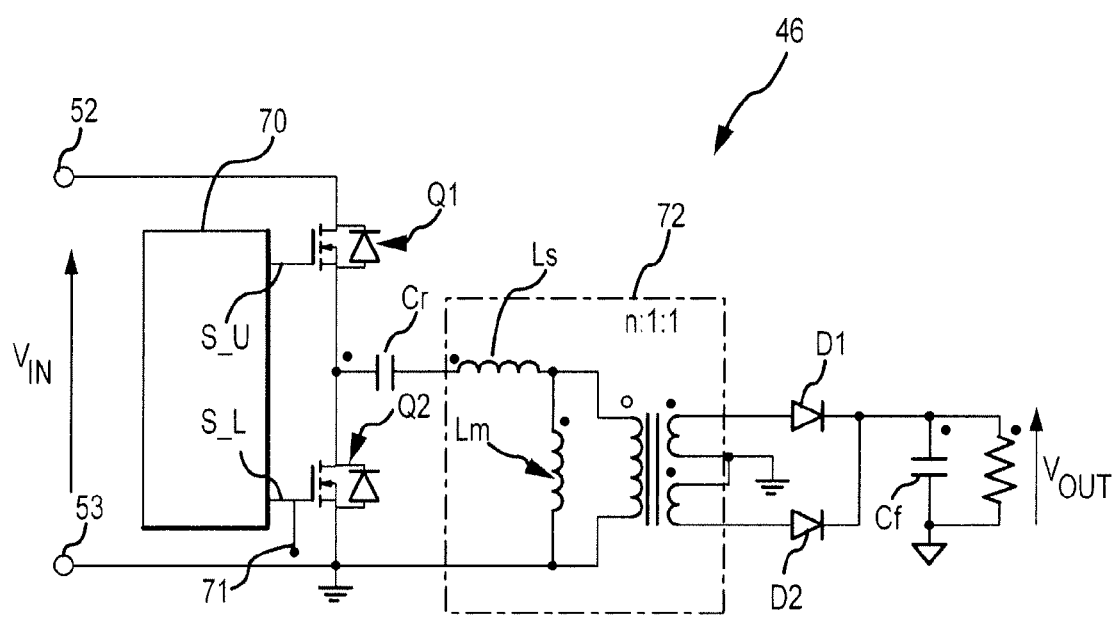
FIG. 6 shows the circuit diagram of a resonant circuit DC-DC LLC converter to be used in the power supply system of FIG. 4.

FIG. 6 schematically shows an example of a DC-DC switching converter 46 with a resonant circuit LLC to be used in the power supply system 40. In the particular example shown in FIG. 6, such DC-DC switching converter 46 is of the so called half-bridge type.

The DC-DC switching converter 46 comprises a resonant circuit LLC Cr, Ls, Lm, or resonant cell, comprising a capacitor Cr and two inductances Ls, Lm. Preferably, as in the example shown, the resonant circuit LLC is a series resonant circuit. Preferably, the inductances Ls, Lm, also called resonant inductance Lr and magnetizing inductance Lm, are integrated in a transformer 72 for coupling the load to resonant circuit and at the same time defining an insulating barrier. In the example shown, this transformer 72 is a transformer having a primary winding and two secondary windings.

In order to drive the resonant circuit LLC a so called power control circuit is provided, comprising two switches Q1, Q2, or power switches, series-connected to each other, for example two MOSFETs, and also comprising a controller 70 of said switches Q1, Q2, for generating a first control signal S_u and a second control signal S_1 for driving the first Q1, and second Q2 switch, respectively. The controller 70 may be provided for example by using an integrated circuit manufactured by Stmicroelectronics, as model L6599.

Control signals S_u and S_1 are square wave signals, such as when one of the two switches Q1, Q2 is conductive, the other switch is blocking and vice versa. As can be noted in FIG. 6, one of these switches, in particular switch Q2, when in a conductive state, is parallel-connected to the resonant circuit, formed by the series of components comprised of capacitor Cr and inductances Ls and Lp. From now on, this switch Q2 will be called the low-side switch Q2.

The other one of switches Q1, Q2, i.e. switch Q1, when in a conductive state, is series-connected with the resonant circuit comprised of the series of components capacitor Cr and inductances Ls and Lm. From now on, this switch Q1 will be called the high-side switch Q2.

Also referring to FIG. 6, the DC-DC switching converter 46 also comprises a rectifier circuit connected to the secondary of insulating transformer 72, and comprising two diodes D1, D2 and a filter capacitance Cf.

With reference to FIG. 4, the DC-DC switching converter 46 is fed by the output of PFC pre-regulator 45 and is such as to be controlled by the power control circuit in order to operate at a fixed and constant frequency, i.e. a frequency that that does not depend on the load. Such fixed and constant frequency is only imposed by the control circuit 70 in a open loop operating mode, in other words without any feedback loop for controlling such frequency for example with respect to the load to be supplied. For the above reason the half bridge resonating converter operates at a rigidly fixed frequency in a open loop mode. According to an embodiment the half bridge converter operates with a duty cycle of 50%.

According to an embodiment the above fixed and constant frequency is nominally equal the series resonant frequency of the LLC converter (in the real practice such frequencies could be slightly different due to the tolerances of the circuit components).

According to an embodiment, the above mentioned fixed frequency is equal to operating frequency $f_{sw}$ of PFC pre-regulator 45.

In this way, advantageously, no intermodulation harmonics are present, which may lie within the transmission band of PLM modem.

It is to be noted that the resonant converters of the LLC type have two resonance frequencies: one lower parallel resonant frequency$_{r2}$, and a higher series resonant frequency $f_{r1}$. A special feature of this type of resonant converters is the fact that when they operate at the series resonant frequency $f_{r1}$, they tend towards a constant input-output conversion ratio, which is not dependent from the load.

Figure 7:
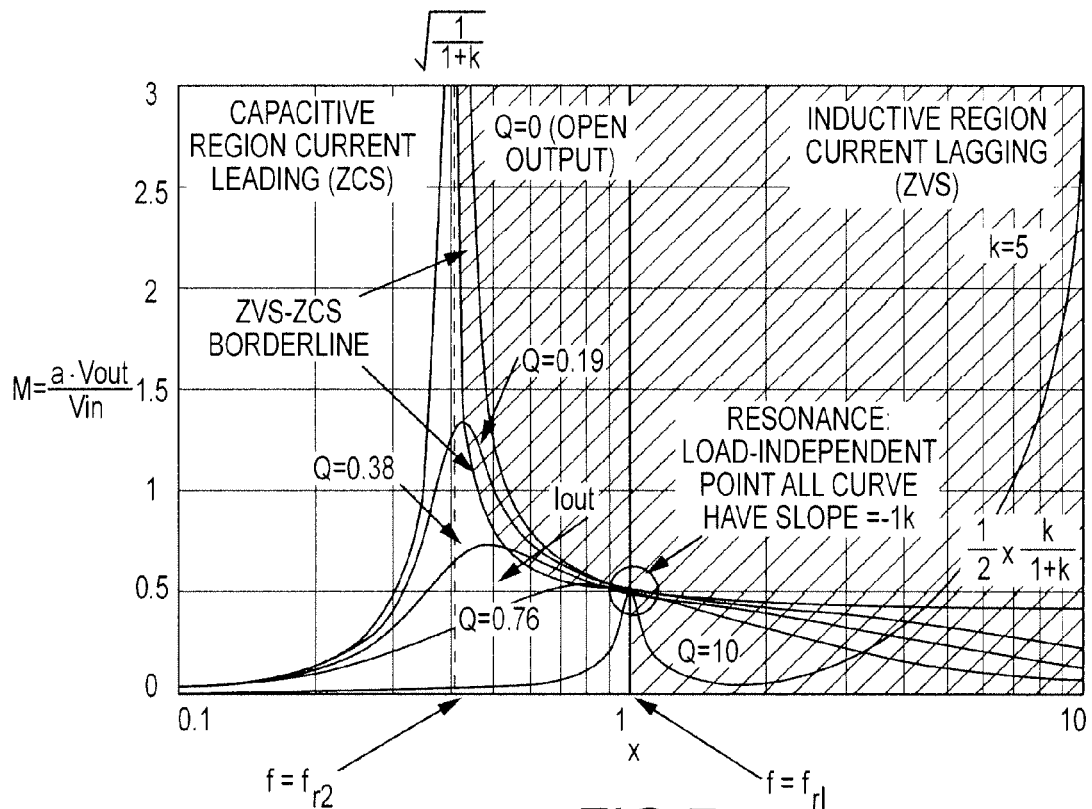
FIG. 7 shows a diagram representing the operating characteristics of converter of FIG. 6.

With reference to FIG. 7, a diagram of the operating characteristics of the resonant LLC converter 46 of FIG. 6 is shown. On the abscissa, the operating frequency f is normalized with respect to series resonant frequency $f_{r1}$; on the ordinate, the ratio M between the output voltage $V_{OUT}$ (referred to the primary, according to the "a" windings ratio of transformer) and input voltage $V_{IN}$. A family of curves is obtained for each value of quality factor Q of resonant circuit, which is essentially proportional to output current. It is to be noted that all the curves go through the "resonance" point (1, 0.5), which means that the ratio input-output voltage is not depending from the load ("load independent point") if the system works at resonant frequency $f_{r1}$. It is to be noted that in the "resonance" point, all curves have a slope which is equal −1/k (wherein k=Lm/Ls).

In the diagram of FIG. 7, two different hues indicate the so called capacitive operating region, or ZCS region and the so called inductive operating region, or ZVS region. In FIG. 7, the "ZVS-ZCS borderline" indicates the border between region ZCS and ZVS.

Figure 3:
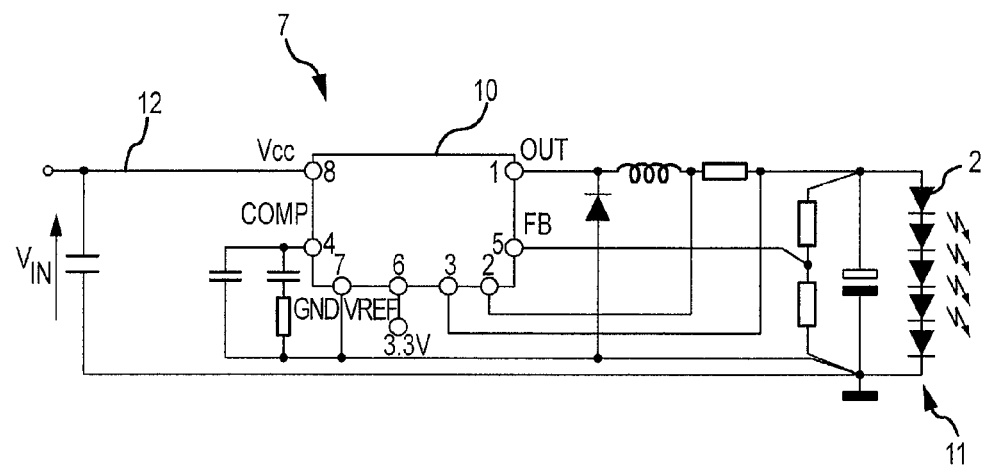
FIG. 3 shows the circuit diagram of a current regulator of the known art, which may be used in the supply system of FIG. 3.

With reference to FIG. 3, the synchronization system 48 is such as to interlock the frequency of oscillator of controller 54 of PFC (FIG. 5) to that of DC-DC switching converter 46 in order to ensure that the two operating or switching frequencies are effectively identical. It is preferred that the DC-DC switching converter 46 syncs the PFC pre-regulator 45 and not vice versa, since in the commercial devices for controlling resonant converters, the oscillator precision is usually a lot better than that of the oscillator of control devices for PFC pre-regulators.

Figure 1:
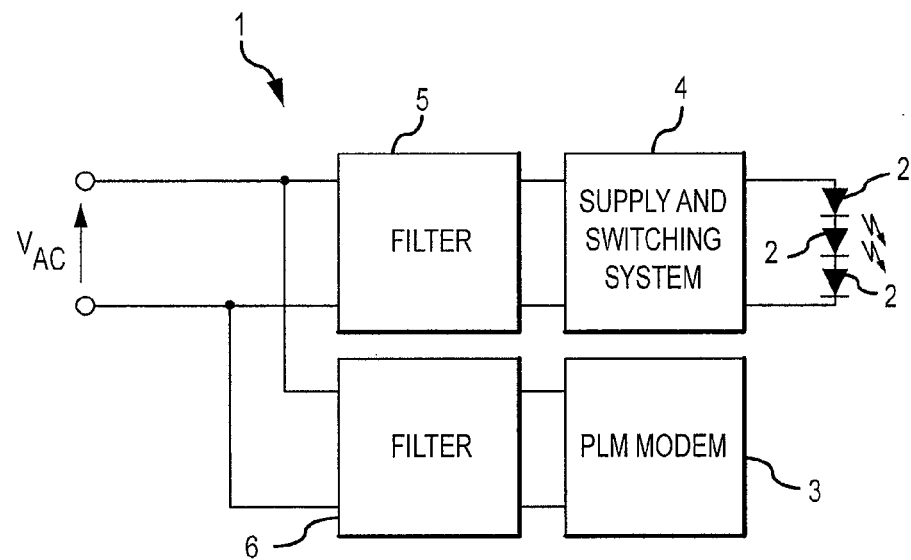
FIG. 1 shows a functional block diagram of a LED diode lighting apparatus of the known art, comprising a switching supply system and a PLM modem.
Figure 2:
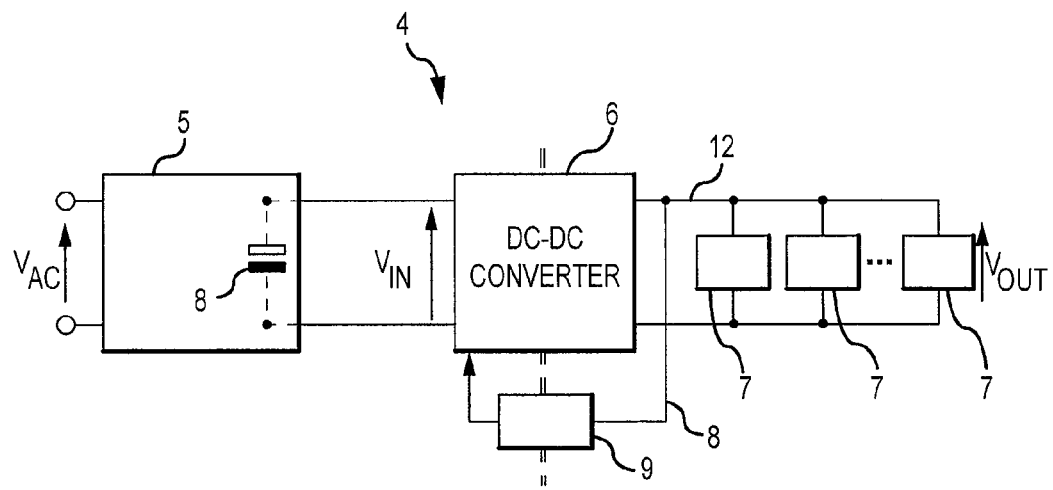
FIG. 2 shows a functional block diagram of a LED diode lighting apparatus of the known art, which may be used in the lighting apparatus of FIG. 1.

Based on the above, in a particularly advantageous embodiment, the LLC resonant circuit of DC-DC switching converter 46 has a series resonant frequency $f_{r1}$ equal to the operating frequency $f_{sw}$ common to DC-DC switching converter 46 and PFC pre-regulator 45, so that the output voltage $V_{OUT}$ of said resonance converter 46 is in a constant ratio with respect to input voltage $V_{IN}$. Since the latter is regulated (since it represents the voltage $V_{IN}$ output by PFC pre-regulator 45), also the output voltage of DC-DC switching converter 46 will be approx. constant even without a feedback loop. In this way, advantageously, no photo-coupler and feedback system connected to the load (or better to the secondary winding/windings of the output transformer) are required, contrary to the description previously made with reference to the power supply system of the known art of FIG. 2, which increases the robustness and average life span of the switching power supply system and corresponding lighting apparatus with lower costs in the near and long term.

Figure 8:
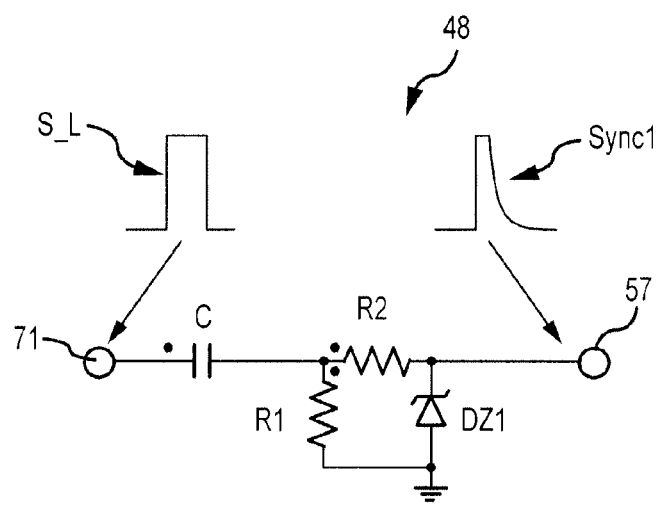
FIG. 8 shows the circuit diagram of an example of a circuit for synchronizing the PFC pre-regulator of the power supply system of FIG. 4.

If the DC-DC switching converter 46 is as described above (FIG. 6) with a half-bridge topology, it is preferred that the synchronization of the PFC pre-regulator take place so that the power switch 55 of PFC pre-regulator 45 is switched on at the same time as the half bridge low side power switch Q2. FIG. 8 shows how the synchronization system 48 may be made of commercially available devices, using a differentiation block C, R1 comprising a capacitor C and resistor R1 and clamping block comprising resistor R2 and Zener diode DZ1. In the system 48 the rising front of signal S_L driving the gate of power switch Q2 (picked up at terminal 71 of FIG. 6), is differentiated by differentiation block C, R1 and in the following, the Zener diode DZ1 is such as to perform a clamping on said differentiated signal. The resistor R2 is provided for limiting the current injected into the Zener diode DZ1. The generated impulse Sync1 is provided to sync input 57 of controller 54 of PFC pre-regulator 45 such as to cause the synching of oscillator 65 as well as activation of driver 56.

Figure 9:
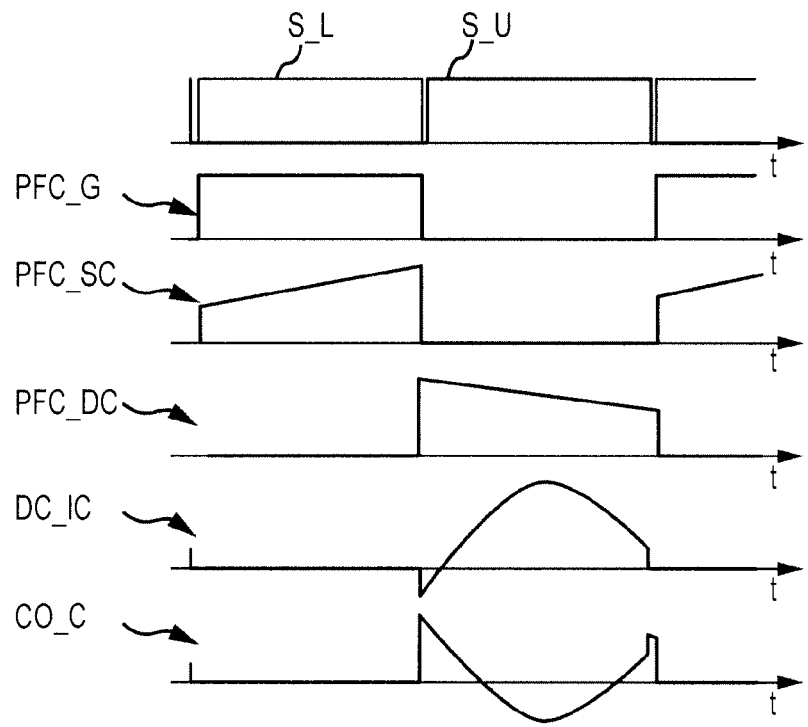
FIG. 9 shows some time diagrams referring to wave forms of voltage or current signals which may be observed in the switching power supply system of FIG. 4, in a first synchronization mode of PFC pre-regulator.

In this way, as shown in the time diagrams of FIG. 9, wherein:
S_L is the control signal of low-side switch Q2,
S_U is the control signal of high-side switch Q1,
PFC_G is the voltage at gate of switch 55 of PFC pre-regulator 45,
PFC_SC is the current in switch 55 of PFC pre-regulator 45,
PFC_DC is the current in diode 59 of PFC pre-regulator 45,
DC_IC is the input current of DC-DC switching converter 46,
CO_C is the current in the output capacitor 9 of PFC pre-regulator 45, with the trend towards a synchronization of current drawn by DC-DC switching converter 46 with injection of current by diode 59 of PFC pre-regulator, in order to minimize the current injected at a frequency $f_{sw}$ in the output capacitor 8 of PFC pre-regulator 45. In fact, it may be observed that, as in FIG. 9, the current CO_C (average value equal zero) in the electrolytic output capacitor 8 of PFC pre-regulator 45 is relatively small with a relatively low rms value. This contributes to a stress reduction in said capacitor 8 and therefore to a prolonging of its life and robustness.

Figure 10:
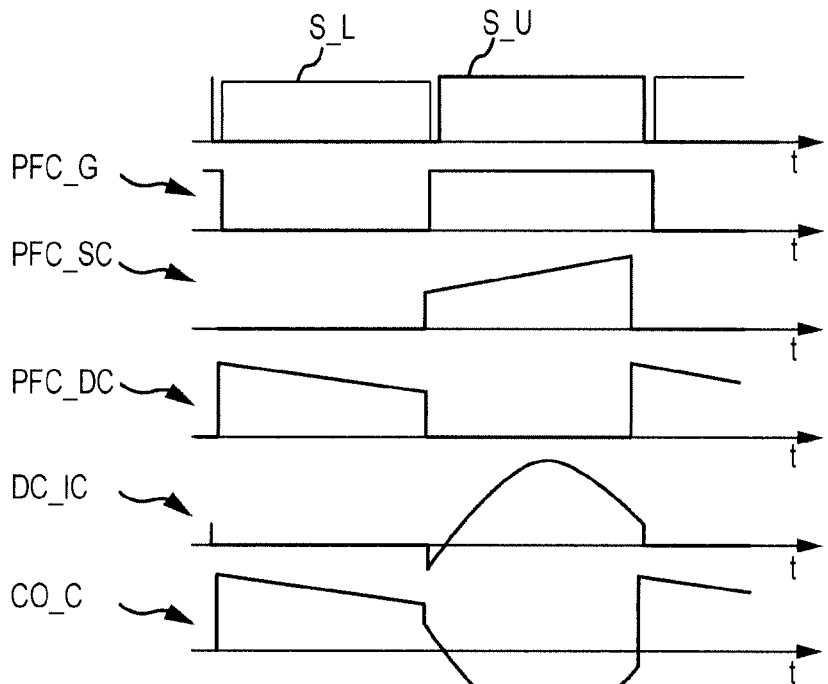
FIG. 10 shows some time diagrams referring to wave forms of voltage or current signals which may be observed in the switching power supply system of FIG. 4, in a second synchronization mode of PFC pre-regulator.

With reference to FIG. 10, it is to be noted that on the contrary, if the PFC pre-regulator 45 were to be synchronized, based on the control signal S_U of the high-side switch Q1, the current CO_C (zero average value) in output capacitor 8 would be relatively high with a relatively high rms value. Therefore, this configuration represents a possible but less preferred choice with respect to the preceding.

With reference to FIG. 4, the power supply system 40 also comprises current regulators 7, each associated to a respective LED diode string to be powered. Preferably, such current regulators 7 are switching regulators, for example of the already specified type with reference to FIG. 3 regarding the supply systems of the known art.

Advantageously, the current regulators 7 are sized in order to absorb possible voltage variations $V_{OUT}$ at input, due to transient changes of input voltage $V_{IN}$ of DC-DC switching converter 46. In principle, the operating frequency of said current regulators 7 may differ from the operating frequency $f_{sw}$ of PFC pre-regulator 45, in that these operate on the secondary side of DC-DC switching converter 46 and therefore the noise visible on the primary (the side to which also the PLM modem is connected), would be strongly reduced. However, in a "single tone" embodiment, the frequency of said current regulators 7 may be synchronized to that of DC-DC switching converter 46 and PFC pre-regulator 45 by a suitable syncing system 49, which is conceptually analogous to that of FIG. 8, wherein the secondary side signals would be used for syncing, for example the voltage on one of secondary windings of transformer 72.

From the above description it is therefore possible to understand, how such a switching power supply system may reach the required goals. In fact, it has been pointed out in the present description, that the omission of the photo-coupler allows a greater robustness and a longer average life of the power supply system and generally of the lighting apparatus. Moreover, it has been pointed out that by setting the frequency of the PFC pre-regulator at a value equal to the series resonant frequency of DC-DC converter, the generation of intermodulation harmonics may be avoided, which may fall within the transmission band of PLM modem. It has been also demonstrated how it is possible to reduce stress on the electrolytic output capacitor 8 of PFC pre-regulator.

It is also to be noted that with above said measures, it is possible to minimize the filters used in the power supply system, since for their manufacturing it is only necessary to follow the regulations regarding electromagnetic compatibility over emissions. Such regulations typically impose less severe limitations with respect to those required for ensuring the integrity of signals received by the PLM modem, as well as the signals transmitted by the same PLM modem. Therefore the economic advantage is undeniable.

The only small drawback with respect to a power supply system of the known art with a DC-DC switching converter whose output voltage is regulated by a closed loop, is that in a power supply system of above type, it is necessary to operate with a slightly higher output voltage in order to account for the transient changes of output voltage of PFC pre-regulator due to load variations, and this slightly reduces the conversion efficiency. However, this small drawback is a lot less severe vis a vis the advantages obtainable with a power supply system of above said type.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

The invention claimed is:

1. A switching power supply for supplying a load requiring a controlled current, comprising:
a PFC pre-regulator for receiving an input voltage and providing an output voltage;
a DC-DC switching converter, which operates at a fixed and constant operating frequency, for receiving at input the voltage output by the pre-regulator and for providing at output a supply voltage of said load; and
a passive synchronization system for interlocking the operating frequency of said PFC pre-regulator with the operating frequency of said DC-DC converter.

2. A switching power supply according to claim 1 wherein said passive synchronization system comprises a differentiation block.

3. A switching power supply according to claim 2 wherein said differentiation block comprises a resistor and a capacitor.

4. A switching power supply according to claim 1 wherein said passive synchronization system comprises a clamping block.

5. A switching power supply according to claim 4 wherein said clamping block comprises a resistor and a Zener diode.

6. A switching power supply for supplying a load requiring a controlled current, comprising:
a PFC pre-regulator for receiving an input voltage and providing an output voltage;
a DC-DC switching converter, which operates at a fixed and constant operating frequency, for receiving at input the voltage output by the pre-regulator and for providing at output a supply voltage of said load; and
a passive synchronization system for interlocking the operating frequency of said PFC pre-regulator with the operating frequency of said DC-DC converter having an input coupled to the DC-DC switching converter and an output coupled to the PFC pre-regulator.

7. A switching power supply as in claim 6 wherein the passive synchronization system comprises a differentiation block coupled to a clamping block.

8. A switching power supply for supplying a load requiring a controlled current, comprising:
a PFC pre-regulator for receiving an input voltage and providing an output voltage;
a DC-DC switching converter, which operates at a fixed and constant operating frequency, for receiving at input the voltage output by the pre-regulator and for providing at output a supply voltage of said load, wherein said switching DC-DC converter includes a resonant converter comprising an LLC resonant circuit; and
a passive synchronization system for interlocking the operating frequency of said PFC pre-regulator with the operating frequency of said DC-DC converter.

9. A switching power supply according to claim 8, wherein said fixed operating frequency is a series resonant frequency of said LLC resonant circuit.

10. A switching power supply according to claim 8 wherein said PFC pre-regulator operates at a fixed operating frequency which substantially equals the operating frequency of said LLC converter.

11. A switching power supply according to claim 8 wherein said PFC pre-regulator is a FF-CCM (Fixed Frequency-Continuous Conduction Mode) type boost converter.

12. A switching power supply according to claim 8, wherein said load comprises one or more power LED diodes.

13. A switching power supply according to claim 8, wherein said resonant converter operates in an open loop operating mode.

14. A switching power supply according to claim 8, wherein said fixed frequency is not controlled by any feedback loop connected to said load.

15. A switching power supply according to claim 8, wherein said DC-DC converter is a half-bridge converter and said LLC resonant circuit comprises a capacitor, a resonant inductance and a magnetizing inductance which are series connected.

16. A switching power supply according to claim 15, wherein said LLC resonant circuit comprises a control circuit comprising two series connected switches, also comprising a controller of said switches, for generating a first control signal and a second control signal for driving the first and second switch, respectively, the control signals being square wave signals, such as when one of the switches is conducting, the other of such switches is interdicted and vice versa, one of said switches, or low-side switch, when in a conduction state, being parallel connected to LLC resonant circuit represented by said capacitor and said inductances connected in series, and wherein said synchronization system is such as to provide said frequency interlocking based on the control signal of said low-side switch.

17. A switching power supply according to claim 8, further comprising a current regulator provided between said DC-DC converter and said load.

18. A switching power supply according to claim 17, comprising a synchronization system for synchronizing said current regulator at the operating frequency of said DC-DC converter.

19. A lighting apparatus comprising one or more strings of power LED diodes which are parallel connected and a switching power supply according to claim 8, wherein said load comprises said one or more strings of power LED diodes.

20. A lighting apparatus according to claim 19, further comprising a PLM modem employing a frequency band between $f_{min}$ and $f_{max}$ wherein $f_{min}$, is minor than $f_{max}$, said operating frequency of DC-DC converter being at a lower value than $f_{min}$ if $f_{max}/f_{min} \leqq 2$ and at a higher than $f_{max}$ if $f_{max}/f_{min} > 2$.

* * * * *

UNITED STATES PATENT AND TRADEMARK OFFICE
CERTIFICATE OF CORRECTION

PATENT NO. : 8,330,389 B2
APPLICATION NO. : 12/643883
DATED : December 11, 2012
INVENTOR(S) : Claudio Adragna It is certified that error appears in the above-identified patent and that said Letters Patent is hereby corrected as shown below:

Column 12, line 8, "$\leqq$" should be --$\leq$--

Signed and Sealed this
Nineteenth Day of February, 2013

Teresa Stanek Rea
*Acting Director of the United States Patent and Trademark Office*